US012449390B2

(12) United States Patent
Doran et al.

(10) Patent No.: US 12,449,390 B2
(45) Date of Patent: Oct. 21, 2025

(54) ANALYTE DETECTION SYSTEM

(71) Applicant: UNIVERSITY OF THE WEST OF ENGLAND, BRISTOL, Bristol (GB)

(72) Inventors: Olena Doran, Bristol (GB); Adrian Crew, Bristol (GB); John P Hart, Bristol (GB); Kelly Westmacott, Bristol (GB)

(73) Assignee: UNIVERSITY OF THE WEST OF ENGLAND, BRISTOL, Bristol (GB)

( * ) Notice: Subject to any disclaimer, the term of this patent is extended or adjusted under 35 U.S.C. 154(b) by 544 days.

(21) Appl. No.: 17/794,524

(22) PCT Filed: Jan. 27, 2021

(86) PCT No.: PCT/EP2021/051859
§ 371 (c)(1),
(2) Date: Jul. 21, 2022

(87) PCT Pub. No.: WO2021/151943
PCT Pub. Date: Aug. 5, 2021

(65) Prior Publication Data
US 2023/0073825 A1 Mar. 9, 2023

(30) Foreign Application Priority Data
Jan. 28, 2020 (GB) ..................... 2001177

(51) Int. Cl.
G01N 27/27 (2006.01)
G01N 27/07 (2006.01)
(Continued)

(52) U.S. Cl.
CPC ............. *G01N 27/27* (2013.01); *G01N 27/07* (2013.01); *G01N 27/286* (2013.01); *G01N 27/333* (2013.01); *G01N 33/12* (2013.01)

(58) Field of Classification Search
None
See application file for complete search history.

(56) References Cited

U.S. PATENT DOCUMENTS

2014/0372069 A1* 12/2014 Nuzzio .................. G01D 21/00
702/123

FOREIGN PATENT DOCUMENTS

CN 209148584 U * 7/2019
EP 2 966 441 A1 1/2016
(Continued)

OTHER PUBLICATIONS

Search Report issued in United Kingdom Patent Application No. GB2001177.1 dated Mar. 22, 2021.
(Continued)

*Primary Examiner* — J. Christopher Ball
(74) *Attorney, Agent, or Firm* — Troutman Pepper Locke LLP

(57) ABSTRACT

The invention relates to a system for detecting one or more analytes in a sample. The system comprises a probe for insertion into the sample, the probe having a first electrochemical sensor configured to detect a first analyte in the sample, and a second electrochemical sensor configured to detect a second analyte in the sample. A first potentiostat is connected to the first electrochemical sensor and configured to perform a first electrochemical measurement with the first electrochemical sensor. Additionally, a second potentiostat is connected to the second electrochemical sensor and configured to perform a second electrochemical measurement with the second electrochemical sensor. The first potentiostat and the second potentiostat are electrically isolated from one another.

12 Claims, 7 Drawing Sheets

(51) Int. Cl.
    *G01N 27/28*    (2006.01)
    *G01N 27/333*   (2006.01)
    *G01N 33/12*    (2006.01)

(56)            References Cited

FOREIGN PATENT DOCUMENTS

WO      2013/153406 A1    10/2013
WO      2019/030338 A1    2/2019

OTHER PUBLICATIONS

International Search Report and Written Opinion issued in International Patent Application No. PCT/EP2021/051859 dated Apr. 8, 2021.
Lee Ikho et al. "A Reconfigurable and Portable Highly Sensitive Biosensor Platform for ISFET and Enzyme-Based Sensors" IEEE Sensors Journal 16(11)L4443-4451 (2016) cited in ISR.
Quinn C P et al. "Battery-Powered Miniature Bipotentiostats for Amperometric Biosenseors" Instrumentation Science & Technology, 24(4):263-275 (1996) cited in ISR.

\* cited by examiner

3-Methylindole                                Oxidation products

ANALYTE DETECTION SYSTEM

CROSS REFERENCE TO RELATED APPLICATIONS

The present application is a U.S. National Phase Application under 35 U.S.C. § 371 of International Patent Application No. PCT/EP2021/051859 filed Jan. 27, 2021, which claims priority of GB Patent Application No. 2001177.1 filed Jan. 28, 2020. The entire contents of which are hereby incorporated by reference.

FIELD OF THE INVENTION

The invention relates to a system for detecting one or more analytes in a sample.

BACKGROUND TO THE INVENTION

In order to characterise a chemical, biological or food sample, it is often desirable to detect and quantify one or more analytes within that sample. There is a wide range of known measurement techniques for detecting and quantifying analytes in a sample, such as electrochemical measurements, chromatographic measurements, mass spectrometry or immunoassays (among others).

As an example, in the pig industry, pork may be tested in order to detect compounds that are associated with "boar taint". Boar taint refers to a strong unpleasant odour and taste that can arise in pork products derived from male pigs. It is known that boar taint is related to the presence of two compounds in subcutaneous adipose tissue of pigs: skatole (3-methyl-indole) and androstenone (5α-androst-16-en-3-one). Skatole is produced from amino acid tryptophan by bacterial action in pig gut, and androstenone is produced in the testes along with the biosynthesis of testosterone. High skatole levels can be found not only in male pigs, but also in some sows. Thresholds for skatole and androstenone concentrations in relation to boar taint differ between countries, and currently there are no internationally accepted thresholds. A common strategy for reducing boar taint is surgical castration of male pigs. However, castration has been discontinued in an increasing number of countries due to animal welfare issues. Alternative methods to castration include genetic selection towards boar-taint-free pigs, or through dietary manipulation to reduce the levels of skatole and androstenone. In both cases it is necessary to monitor skatole and androstenone levels in order to ensure that they are kept to a low level. Accordingly, there is a need for a method for efficiently evaluating skatole and/or androstenone levels in pork.

The inventors previously developed a sensor array for detecting skatole and androstenone in a sample, as described in EP296641B1, the entirety of which is incorporated herein by reference.

SUMMARY OF THE INVENTION

The present invention provides a development of the technology described in the inventors' earlier patent EP296641B1.

At its most general, the present invention provides an analyte detection system having a probe with multiple electrochemical sensors for detecting one or more analytes, where each electrochemical sensor is connected to a respective potentiostat for performing a measurement with that electrochemical sensor. The respective potentiostats are each electrically isolated from one another. The inventors have found that such a setup may enable simultaneous measurements to be performed with the multiple electrochemical sensors, such that a separate analyte signal may be obtained from each of the respective potentiostats. In particular, the inventors have found that by providing a respective potentiostat for each electrochemical sensor, and by electrically isolating the respective potentiostats from one another, it is possible to avoid cross-talk between the measurements performed with the electrochemical sensors. As a result, the presence of multiple analytes in a sample may be accurately detected and quantified by performing simultaneous measurements with the multiple electrochemical sensors.

In contrast, the inventors have found that, when using a conventional multi-channel potentiostat to simultaneously detect multiple analytes in a single sample, there is often cross-talk or interference between the different measurements. Such cross-talk or interference may result in noisy or erroneous measurement data, such that the multiple analytes cannot be reliably detected and/or quantified.

In the analyte detection system of the invention, as the multiple electrochemical sensors are located on the same probe, it may be possible to detect the presence of multiple analytes at a same location within the sample. Moreover, by enabling the simultaneous detection of multiple analytes, a total measurement time for detecting the analytes may be reduced. Indeed, in conventional methods, measurements for detecting different analytes are often performed sequentially (i.e. one after the other), which results in a longer overall measurement time. The inventors have found that a drawback of performing electrochemical measurements sequentially is that, following a first electrochemical measurement performed on a sample, the effectiveness and accuracy of subsequent electrochemical measurements on the sample may be reduced. This may, for example, be because the first electrochemical measurement affects the sample (e.g. by electro-activating or otherwise transforming analytes in the sample) in a manner that impacts the subsequent electrochemical measurements. This drawback may be avoided with the analyte detection system of the invention, by performing the electrochemical measurements simultaneously.

According to a first aspect of the invention, there is provided an analyte detection system comprising: a probe for insertion into a sample, the probe having a first electrochemical sensor configured to detect a first analyte in the sample, and a second electrochemical sensor configured to detect a second analyte in the sample; a first potentiostat connected to the first electrochemical sensor and configured to perform a first electrochemical measurement with the first electrochemical sensor; and a second potentiostat connected to the second electrochemical sensor and configured to perform a second electrochemical measurement with the second electrochemical sensor; wherein the first potentiostat and the second potentiostat are electrically isolated from one another.

The analyte detection system of the invention may be used for detecting and/or quantifying analytes in any suitable chemical or biological sample. For example, a sample may include a solution which may contain one or more analytes to be detected and/or quantified. As another example, a sample may include a piece of biological tissue which may contain one or more analytes to be detected and/or quantified. In some examples, the analyte detection system may be used in the food industry, for detecting and/or quantifying one or more analytes in a food sample. Where the analyte detection system is used in the meat (e.g. pig)

industry, a sample may include a live animal, a sample from a live animal, an animal carcass, a sample from the animal carcass, a meat product, or a sample of the meat product.

Herein, an analyte may refer to a chemical substance (e.g. a chemical compound) which is to be detected in the sample.

The probe may be designed for insertion into the sample. Thus, the probe may be shaped differently depending on the type of sample being studied, e.g. to facilitate insertion into the sample. The probe may include a support material (e.g. a substrate) on which the first electrochemical sensor and the second electrochemical sensor are disposed. The first electrochemical sensor and the second electrochemical sensor may be disposed on a surface of the probe. The support material of the probe may be electrically insulating, so that the first electrochemical sensor is electrically isolated from the second electrochemical sensor.

The first electrochemical sensor and the second electrochemical sensor may be arranged on the probe such that they are configured to measure substantially the same part of the sample. For example, the first electrochemical sensor and the second electrochemical sensor may be in close proximity to one another on the probe.

The first electrochemical sensor and the second electrochemical sensor may each comprise any suitable electrochemical sensor or biosensor. For example, an electrochemical sensor may include three electrodes: a working electrode, a counter electrode and a reference electrode. In another example, an electrochemical sensor may include two electrodes: a working electrode and a counter/reference electrode (e.g. the counter electrode and the reference electrode may be combined into a single electrode). The first electrochemical sensor and second electrochemical sensor may have the same or different electrode configurations, depending on the analyte to be detected by each sensor. The electrodes may be made using any suitable materials, e.g. metals such as gold, platinum or silver, and/or carbon materials.

In some embodiments, the first and/or second electrochemical sensors may respectively include a working electrode in the form of a screen-printed carbon electrode (SPCE), and an Ag/AgCl reference electrode. The Ag/AgCl reference electrode may have an Ag:AgCl ratio of substantially 60:40, e.g. the Ag/AgCl reference electrode may be screen-printed using an Ag/AgCl ink having an Ag:AgCl ratio of substantially 60:40. The inventors have found that such an electrode configuration may provide a good sensitivity for analyte detection in a sample. In particular, such an electrode configuration may result in a good sensitivity for the detection of skatole and androstenone in a sample. Of course, other Ag:AgCl ratios (e.g. other than 60:40) may be used for the Ag/AgCl reference electrodes.

The first electrochemical sensor is configured to detect a first analyte in the sample. Thus, the first electrochemical sensor may be arranged such that a first electrochemical reaction, which involves the first analyte, occurs at the first electrochemical sensor when the first electrochemical measurement is performed by the first potentiostat. In this manner, the first analyte may be detected at the first electrochemical sensor, e.g. based on a change in voltage or current across the first electrochemical sensor during the first electrochemical measurement. For example, the first electrochemical sensor may include a first reactant (e.g. an enzyme and/or redox mediator) which reacts with the first analyte during the first electrochemical measurement, e.g. deposited on one or more electrodes of the first electrochemical sensor. Additionally or alternatively, the first reactant may be provided in the sample.

The second electrochemical sensor is configured to detect a second analyte in the sample. Thus, the second electrochemical sensor may be arranged such that a second electrochemical reaction, which involves the second analyte, occurs at the second electrochemical sensor when the second electrochemical measurement is performed by the second potentiostat. In this manner, the second analyte may be detected at the second electrochemical sensor, e.g. based on a change in voltage or current across the second electrochemical sensor during the second electrochemical measurement. For example, the second electrochemical sensor may include a second reactant (e.g. an enzyme and/or redox mediator) which reacts with the second analyte during the first electrochemical measurement, e.g. deposited on one or more electrodes of the second electrochemical sensor. Additionally or alternatively, the second reactant may be provided in the sample.

The first analyte and second analyte may be different analytes. In this manner, the analyte detection system may be used to simultaneously detect two different analytes within the sample.

However, in some cases, the first analyte and the second analyte may be the same analyte. This may enable the analyte to be detected via two separate electrochemical measurements, which may improve an accuracy and reliability with which the analyte can be detected and quantified. In such a case, the first and second electrochemical reactions may be the same, i.e. the analyte detection system may perform the same electrochemical measurement with each of the first and second electrochemical sensors. Alternatively, the first and second electrochemical reactions may be different, such that a same analyte may be detected separately using two different electrochemical reactions.

Herein, an electrochemical reaction may refer to a chemical reaction which is caused by the application of a current or a voltage (e.g. to an electrode of an electrochemical sensor). Such an electrochemical reaction may involve an electron transfer from a compound, thus changing an oxidation state of the compound.

The first potentiostat is connected (e.g. electrically connected) to the first electrochemical sensor, so that the first potentiostat can perform an electrochemical measurement with the first electrochemical sensor. For example, the first potentiostat may be connected to the first electrochemical sensor via a suitable electrical cable. In particular, the electrodes of the first electrochemical sensor may be electrically connected to the first potentiostat so that the first potentiostat can apply a voltage and/or current across electrodes of the first electrochemical sensor, as well as measure a voltage and/or current across electrodes of the first electrochemical sensor. Likewise, the second potentiostat may be connected to the second electrochemical sensor in a similar manner.

The first potentiostat may be configured to perform any suitable electrochemical measurement with the first electrochemical sensor, in order to detect the first analyte. Similarly, the second potentiostat may be configured to perform any suitable electrochemical measurement with the second electrochemical sensor, in order to detect the second analyte. For example, the first potentiostat and the second potentiostat may each be configured to perform a voltammetry measurement (e.g. cyclic voltammetry, sampled DC voltammetry, pulse voltammetry, square-wave voltammetry) and/or an amperometry measurement (e.g. chronoamperometry). The first and second potentiostats may be both be configured to perform a same type of electrochemical measurement; alternatively the first and second potentiostats may be configured to perform different types of electrochemical measurement. The first potentiostat and the second potentiostat may each include any suitable potentiostat for performing such measurements.

The first potentiostat and the second potentiostat are electrically isolated from one another. In this manner, it may be possible to avoid cross-talk or interference between the measurements performed by the first potentiostat and the second potentiostat. As a result, it may be possible to perform the first and second electrochemical measurements simultaneously without compromising either of the measurements, so that the first and second analytes may be accurately detected.

The first potentiostat and the second potentiostat being electrically isolated from one another may mean that there is no (direct and/or indirect) electrical connection between the first potentiostat and the second potentiostat. Thus, there may be no electrical path between the first potentiostat and the second potentiostat, or any components that they are respectively connected to. This may be achieved in a variety of ways, depending on the configuration of the analyte detection system.

For example, there may be no common ground connected to both the first potentiostat and the second potentiostat. The first electrochemical sensor and the second electrochemical sensor may be electrically isolated from one another (e.g. there may be no shared electrodes between the first and second electrochemical sensors), such that the first and second potentiostats are not connected through the first and second electrochemical sensors. The first potentiostat and the second potentiostat may be housed in separate respective housings, to avoid any electrical connection between the two. The respective housings may be made of an electrically insulating material (e.g. plastic).

The analyte detection system may further comprise a control system that is communicatively coupled to the first potentiostat and the second potentiostat, wherein the control system is configured to control the first electrochemical measurement and the second electrochemical measurement. Thus, the electrochemical measurements performed by the first potentiostat and the second potentiostat may be controlled by the control system. For example, the types of electrochemical measurement and/or parameters of the electrochemical measurements may be controlled by the control system.

The control system may include any suitable computing system or device having software installed thereon for controlling the electrochemical measurements performed by the first and second potentiostats. For example, the control system may include a computer (e.g. laptop or desktop computer), a tablet computer, smartphone or other computing device. The control system may include an input interface, for receiving a user input, and/or a display for displaying results of the first and second electrochemical measurements. The control system may be configured to control the first and second electrochemical measurements based on inputs received from the user.

The control system being communicatively coupled to the first potentiostat and the second potentiostat may mean that the control system is configured to transmit information to, and receive information from, the first potentiostat and the second potentiostat. The control system may be communicatively coupled to the first and second potentiostats via any suitable wired or wireless communication link. The control system may be communicatively coupled to the first potentiostat and the second potentiostat in a manner that avoids electrical communication between the first and second potentiostats through the control system.

The control system may be configured to control the electrochemical measurements performed by the first and second potentiostats by transmitting control signals to the first and second potentiostats, the control signals including indications of parameters for the electrochemical measurements to be performed. The control system may further be configured to receive measurement data from the first and second potentiostats, the measurement data being indicative of results of the first and second electrochemical measurements. For example, measurement data received from the first potentiostat may include an indication of a voltage and/or current measured at the first electrochemical sensor, and measurement data received from the second potentiostat may include an indication of a voltage and/or current measured at the second electrochemical sensor. The control system may then analyse the received measurement data, e.g. in order to determine whether the first analyte and/or second analyte are present in the sample, and/or to determine an amount of the first and/or second analyte in the sample.

More generally, the first potentiostat may be configured to transmit a first output signal to the control system, and the second potentiostat may be configured to transmit a second output signal to the control system. The first output signal may include measurement data indicative of results of the first electrochemical measurement, and the second output signal may include measurement data indicative of results of the second electrochemical measurement. As noted above, the first potentiostat and the second potentiostat may be connected to the control system in a manner that avoids electrical communication between the first and second potentiostats through the control system. This may avoid interference or cross-talk between the output signals from the first and second potentiostats.

It should be noted that in some embodiments, a separate control system may not be required for controlling the first and second potentiostats. For example, a potentiostat may include an internal controller and an input interface via which a user may control parameters of an electrochemical measurement performed by the potentiostat. As a result, a separate control system may not be required. Such a potentiostat may further include an internal memory for recording measurement data from the electrochemical measurement. A user may then retrieve the measurement data from the potentiostat's internal memory in order to further analyse the data.

The analyte detection system may further comprise an isolator circuit connected between the control system and the first potentiostat. In other words, where the control system is communicatively coupled to the first potentiostat via a wired connection, an isolator circuit may be connected between the control system and the first potentiostat. Such an isolator circuit may be configured to electrically isolate the first potentiostat from the control system, whilst still enabling communication between the first potentiostat and the control system. Thus, the isolator circuit may ensure that the first potentiostat is electrically isolated from the second potentiostat, i.e. that the first and second potentiostats are not electrically connected via the control system. Typically, the isolator circuit may comprise one or more transformers connected between an input end and an output end of the isolator circuit, such that an electrical signal may be communicated between the input end to the output end (as well as the other way around) whilst keeping the input end electrically isolated from the output end.

In some embodiments, the control system may include a computing device (e.g. laptop computer) which is communicatively coupled to the first and second potentiostats via a wired connection, the isolator circuit being connected between the computing device and the first potentiostat. Such a configuration may be particularly beneficial, as connecting the isolator circuit between the computing device and the first potentiostat enables both the first and second potentiostats to be controlled by the same computing device, whilst still avoiding cross-talk between the two electrochemical measurements.

The isolator circuit may comprise a USB isolator. So, for example, where the control system is connected to the first potentiostat via a USB connection, the isolator circuit may be in the form of a USB isolator connected between a USB interface on the control system and a USB interface on the first potentiostat (e.g. via a set of USB cables).

In some embodiments, the first potentiostat may be powered by the control system, and/or the second potentiostat may be powered by the control system. This may avoid powering the first potentiostat and/or second potentiostat using mains power, which could result in interference between the first and second electrochemical measurements (e.g. due to a ground loop arising in the system). The first potentiostat and/or the second potentiostat may be powered by the control system via a suitable wired connection, e.g. via a USB connection or similar. Where both the first potentiostat and the second potentiostat are powered by the control system, an isolator may be connected between the first potentiostat and the control system as discussed above, in order to ensure that the first and second potentiostats are electrically isolated from one another.

In some embodiments, the first potentiostat may be battery-powered and/or the second potentiostat may be battery-powered. Thus, the first potentiostat and/or the second potentiostat may each include a respective battery. In this manner, the first potentiostat and the second potentiostat may be powered independently, which may facilitate keeping them electrically isolated from one another, and reduce the risk of cross-talk between the electrochemical measurements. The respective battery for each of the first potentiostat and/or the second potentiostat may be any suitable battery, e.g. a rechargeable battery such as a lithium-ion battery.

In some embodiments, both the first potentiostat and the second potentiostat may be battery-powered. However, in other embodiments one of the potentiostats may be battery powered, whilst the other potentiostat may be powered by other means, e.g. by the control system. In some cases, a potentiostat may be powered by multiple power sources, e.g. it may receive power from the control system in addition to having an internal battery.

In some embodiments, the control system may be configured to communicate wirelessly with the first potentiostat and/or the second potentiostat. Thus, the control system may control the first and/or second electrochemical measurements via wireless communications with the first and/or second potentiostats. In this manner, it may be possible to avoid a wired connection between the control system and the first potentiostat and/or a wired connection between the control system and the second potentiostat. This may serve to electrically isolate the control system from the first potentiostat and/or the second potentiostat, which may reduce a risk of cross-talk or interference between the two electrochemical measurements. This may also prevent an electrical connection between the first and second potentiostats via the control system from arising. Using wireless communication in this manner may further facilitate obtaining measurements, as may facilitate moving the probe relative to the control system, in order to insert the probe into the sample. Wireless communication may be implemented using any suitable wireless communication protocol, such as Bluetooth or Wi-Fi.

In some embodiments, the control system may be battery-powered. This may avoid connecting the control system to mains power, which may reduce a risk of cross-talk between the first and second electrochemical measurements (e.g. due to a ground loop arising in the system). For example, the control system may be powered by a dedicated battery, e.g. a rechargeable battery such as a lithium-ion battery. Making the control system battery-powered may also improve portability of the analyte detection system.

In one embodiment, each of the first potentiostat, the second potentiostat and the control system may be battery powered, e.g. they may each be powered by a respective battery. In this manner, each of the first potentiostat, the second potentiostat and the control system may use independent power sources. This may ensure that there is no interference between the first and second electrochemical measurements, e.g. by ensuring that there are no ground loops in the system.

In some embodiments, the control system includes a first controller that is communicatively coupled to the first potentiostat and configured to control the first electrochemical measurement, and a second controller that is communicatively coupled to the second potentiostat and configured to control the second electrochemical measurement. Thus, the first potentiostat and the second potentiostat may be independently controlled by separate respective controllers. This may serve to ensure that the first and second potentiostats are effectively isolated from one another, so that there is no cross-talk between the first and second electrochemical measurements. The first and second controller may each be in the form of a respective computing device, such as a computer (e.g. laptop or desktop), tablet or smartphone. Communication between the first controller and the first potentiostat may be via a suitable wired or wireless connection, and communication between the second controller and the second potentiostat may be via a suitable wired or wireless connection.

In some embodiments, the first electrochemical sensor may be disposed on a first side of the probe, and the second electrochemical sensor may be disposed on a second, opposite side of the probe. In other words, the first electrochemical sensor and the second electrochemical sensor may be mounted on the probe such that they face substantially opposite directions. This may be referred to as a "back-to-back" configuration of the electrochemical sensors. By providing the first and second electrochemical sensors on opposite sides of the probe, it may be possible to perform the first and second electrochemical measurements at substantially the same location within the sample. This may enable accurate and simultaneous detection of the first and second analytes at a single location within the sample. Additionally, by providing the first and second electrochemical sensors on opposite sides of the probe, a risk of cross-talk between the measurements may be reduced.

The probe may include a support material, such as a substrate, on which the first electrochemical sensor and the second electrochemical sensor are disposed. Then, the first electrochemical sensor may be disposed on a first side of the substrate, and the second electrochemical sensor may be disposed on a second, opposite side of the substrate. The substrate may be a suitable piece of insulating material which carries the first and second electrochemical sensors. In some examples, the substrate may be substantially flat, e.g. it may be a plate-like piece of insulating material.

In some cases, the first electrochemical sensor may be formed on a first substrate, and the second electrochemical sensor may be formed on a second substrate. Then, the first and second substrates may be secured together (e.g. via an adhesive) in order to form the probe. The first and second substrates may be secured together so that the first and second electrochemical sensors face in opposite directions, i.e. so that they are in a back-to-back configuration. Thus, the support material mentioned above may be formed of two separate substrates which are secured together, i.e. the support material of the probe need not necessarily be integrally formed by a single piece of material.

Of course, in other embodiments, other arrangements of the first and second electrochemical sensors are possible. For instance, the first and second electrochemical sensors may be arranged adjacent to one another on a same side of the substrate.

In some embodiments, the first potentiostat may be configured to perform a voltammetry measurement with the first electrochemical sensor, and the second potentiostat may configured to perform a chronoamperometry measurement with the second electrochemical sensor. Thus, different electrochemical measurements may be performed with the first and second electrochemical sensors. This may, for example, enable different analytes to be detected simultaneously using the analyte detection system. The voltammetry measurement may, for example, involve applying a voltage waveform to a working electrode of the first electrochemical sensor, and measuring a resulting current across the first electrochemical sensor. The chronoamperometry measurement may, for example, involve stepping a voltage applied to a working electrode of the second electrochemical sensor from an initial value to a final value, and measuring a resulting change in a current across the second electrochemical sensor over time. The control system described above may control the first and second potentiostats to perform the voltammetry and chronoamperometry measurements, respectively.

The inventors have found that, where the control system includes a single computing device that is communicatively coupled to the first potentiostat and the second potentiostat via wired connections, and where the first potentiostat is configured to perform a voltammetry measurement and the second potentiostat is configured to perform a chronoamperometry measurement, it is particularly beneficial to place an isolator circuit between the computing device and the first potentiostat. This is because, by placing the isolator circuit between the computing device and the potentiostat which performs the voltammetry measurement (i.e. the first potentiostat), it is possible to effectively prevent cross-talk between the voltammetry measurement and the chronoamperometry measurement. Conversely, the inventors have found that by placing the isolator circuit between the computing device and the potentiostat that performs the chronoamperometry measurement (i.e. the second potentiostat), some cross-talk may still arise between the two measurements. The inventors have further found that, when placing a first isolator circuit between the computing device and the first potentiostat, and a second isolator circuit between the computing device and the second potentiostat, cross-talk may still arise between the two measurements. Thus, the inventors have found that placing a single isolator circuit between the computing device and the first potentiostat may provide the best results.

In some embodiments, the first analyte may be skatole and the second analyte may be androstenone. In this manner, the analyte detection system may be used to simultaneously detect skatole and androstenone within a sample, e.g. in order to detect boar taint in a sample. For example, the sample may include a live pig, a sample from a live pig, a pig carcass, a sample from the pig carcass, a pork product, or a sample of the pork product. As the analyte detection system enables simultaneous detection of skatole and androstenone within a single sample, a sample may be quickly and easily tested for boar taint. Moreover, the probe may be directly inserted into a sample without having to further prepare the sample for measurement, thus facilitating the detection of boar taint.

The first electrochemical sensor may be configured to detect skatole. The first electrochemical sensor may be configured to detect skatole by direct oxidation of the skatole at a surface of an electrode (e.g. a working electrode) of the first electrochemical sensor. The oxidation of skatole may be detected by performing a voltammetry measurement with the first electrochemical sensor, in which oxidation of the skatole at the electrode may appear as a current response. Examples of electrochemical sensors for detecting skatole are described, for example, in EP2966441B1.

The second electrochemical sensor may be configured to detect androstenone. For example, the second electrochemical sensor may include an enzyme which is configured to catalyse an electrochemical reaction with androstenone in the sample. The second sensor may comprise NADH or NADPH and an enzyme that metabolises androstenone in the presence of NADH or NADPH As an example, the second electrochemical sensor may include 3-hydroxysteroid dehydrogenase (3-HSD) and NADH or NADPH disposed thereon (e.g. immobilised on an electrode thereof). Two forms of 3-HSD are known: 3α-HSD and 3β-HSD, and either may be used here. When 3-HSD comes into contact with androstenone, androstenone is reduced to androstenol and the NADH or NADPH is oxidised to $NAD^+$ or $NADP^+$. This redox reaction may enable a change in concentration of the NADH or NADPH to be detected as a change in current across the second electrochemical sensor. The change in concentration of NADH or NADPH is proportional to the concentration of androstenone in the sample. Thus, a chronoamperometry measurement may be used to detect androstenone in the sample. Examples of electrochemical sensors for detecting androstenone are described, for example, in EP2966441B1.

Herein NADH and NADPH refer to a reduced form of nicotinamide adenine dinucleotide and nicotinamide adenine dinucleotide phosphate, respectively. Both NADH and NADPH may act in substantially the same way in the reaction mentioned above, and so may both be used. An amount of NADH and NADPH used in the second electrochemical sensor may depend on the electrode configuration, enzyme activity at the electrode surface, and the concentration of androstenone to be analysed. Typically, amounts for NADH or NADPH may be in the range of μg.

In the example above, 3-HSD is provided as an example of an enzyme that may be used with the second electrochemical sensor for detecting androstenone. However, any other enzyme that functions in a similar manner to 3-HSD can be used, e.g. any enzyme that metabolises androstenone in the presence of NADH or NADPH.

Of course, the analyte detection system may also be used to detect other types of analyte (i.e. analytes other than skatole and androstenone). For example the analyte detection system may be used to detect analytes including different types of vitamin, different types of fatty acid, or any other analyte that may be detected via an electrochemical measurement.

In the above discussion of the first aspect of the invention, the analyte detection system has been described as being configured to detect two analytes. However, the analyte detection system may further be configured to detect greater numbers of analytes, using the same principles as discussed above. In particular, the probe may include two or more electrochemical sensors, each configured to detect a respective analyte. The analyte detection system may then include a respective potentiostat for each of the two or more electrochemical sensors, where each of the respective potentiostats is electrically isolated from the others.

According to a second aspect of the invention, there is provided a probe for an analyte detection system, the probe being configured for insertion into a sample and comprising: a first electrochemical sensor configured to detect a first analyte in the sample; and a second electrochemical sensor configured to detect a second analyte in the sample; wherein the first electrochemical sensor is disposed on a first side of the probe, and the second electrochemical sensor is disposed on a second, opposite side of the probe. The probe of the second aspect of the invention may be used as part of the analyte detection system of the first aspect of the invention. Any features discussed above in relation to the probe of analyte detection system the first aspect of the invention may be shared with the probe of the second aspect of the invention. For instance, the first electrochemical sensor and the second electrochemical sensor of the probe of the second aspect may be similar to those discussed in relation to the first aspect. Additionally, features of the probe of the second aspect of the invention discussed below may be included in the analyte detection system of the first aspect of the invention.

As the first and second electrochemical sensors are provided on opposite sides of the probe, it may be possible to perform the first and second electrochemical measurements at substantially the same location within the sample. This may enable accurate and simultaneous detection of the first and second analytes at a single location within the sample. Additionally, by providing the first and second electrochemical sensors on opposite sides of the probe, a risk of cross-talk between the measurements may be reduced.

The probe may include a support material, such as a substrate, on which the first electrochemical sensor and the second electrochemical sensor are disposed. Then, the first electrochemical sensor may be disposed on a first side of the substrate, and the second electrochemical sensor may be disposed on a second, opposite side of the substrate. The substrate may be a suitable piece of insulating material which carries the first and second electrochemical sensors. In some examples, the substrate may be substantially flat, e.g. it may be a plate-like piece of insulating material.

In some embodiments, the first electrochemical sensor may include a first enzyme for catalysing a first electrochemical reaction with the first analyte and/or the second electrochemical sensor may include a second enzyme for catalysing a second electrochemical reaction with the second analyte.

The first analyte may be skatole and the second analyte is androstenone. In this manner, the probe may be used for detecting boar taint. Thus, the first electrochemical sensor may be configured to detect skatole. The first electrochemical sensor may be configured to detect skatole by direct oxidation of the skatole at a surface of an electrode (e.g. a working electrode) of the first electrochemical sensor. The second electrochemical sensor may be configured to detect androstenone. For example, the second electrochemical sensor may include an enzyme which is configured to catalyse an electrochemical reaction with androstenone in the sample.

The second electrochemical sensor may comprise NADH or NADPH and an enzyme that metabolises androstenone in the presence of NADH or NADPH. For example, the second electrochemical sensor may include 3-hydroxysteroid dehydrogenase (3-HSD) and NADH or NADPH disposed thereon. The 3-HSD and NADH or NADPH may, for example, be provided (e.g. immobilised) on an electrode of the second electrochemical sensor, such as a working electrode of the second electrochemical sensor.

The first electrochemical sensor may include a first working electrode and a first reference electrode, and the second electrochemical sensor may include a second working electrode and a second reference electrode. The first and second working electrodes may each be in the form of a respective screen-printed carbon electrode. The NADH or NADPH and the enzyme mentioned above may be disposed on a surface of the second working electrode. The first and second reference electrodes may each be in the form of a respective Ag/AgCl electrode. The Ag/AgCl reference electrodes may have an Ag/AgCl ratio of substantially 60:40, e.g. the Ag/AgCl reference electrodes may be screen-printed using an Ag/AgCl ink having an Ag:AgCl ratio of substantially 60:40. Such an electrode configuration may enable accurate and simultaneous detection of skatole and androstenone in a sample.

BRIEF DESCRIPTION OF THE DRAWINGS

Embodiments of the invention are discussed below with reference to the accompanying drawings, in which:

FIG. 4a shows a view of a first side of the probe;

DETAILED DESCRIPTION

Figure 1:
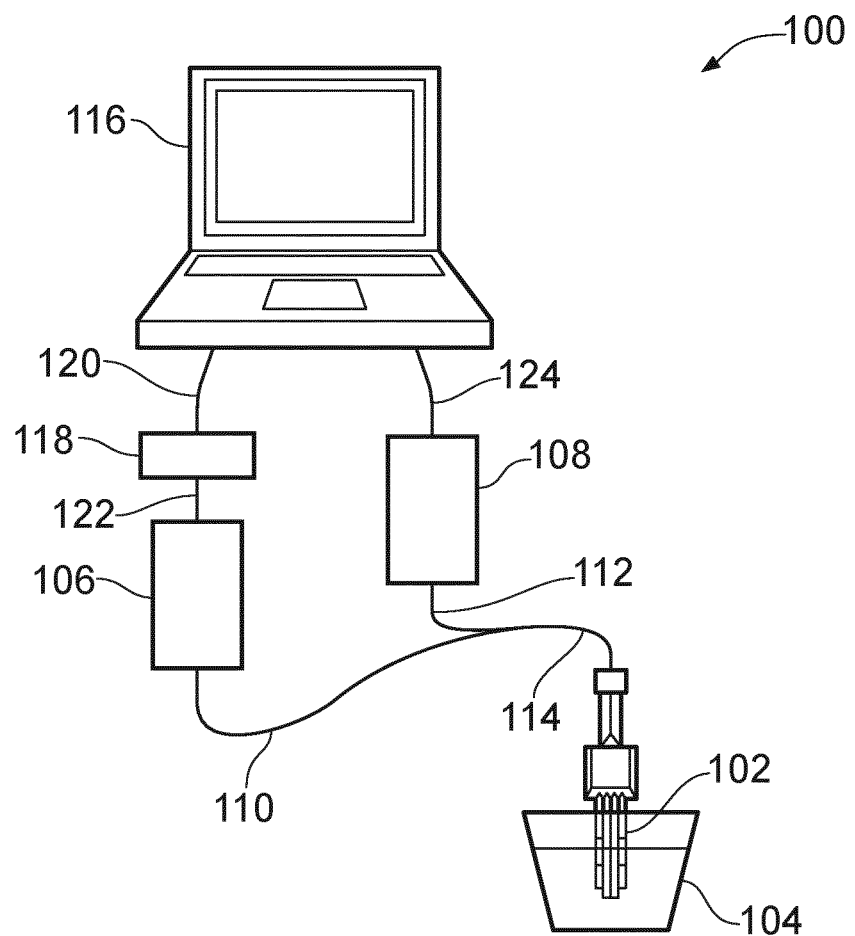
FIG. 1 is a schematic diagram illustrating an analyte detection system according to an embodiment of the invention.

FIG. 1 shows a schematic diagram of an analyte detection system 100 that is an embodiment of the invention. The analyte detection system 100 is configured to enable simultaneous measurement of two analytes within a single sample.

The analyte detection system 100 includes a probe 102 configured for insertion into a sample 104. The probe 102 includes a first electrochemical sensor configured to detect a first analyte in the sample 104, and a second electrochemical sensor configured to detect a second analyte in the sample 104. The first and second electrochemical sensors may include any suitable types of biosensor for detecting the first and second analytes. For example, each of the first electrochemical sensor and second electrochemical sensor may include a three-electrode configuration (e.g. working electrode, reference electrode and counter electrode) or a two-electrode configuration (e.g. working electrode and counter/reference electrode). The first electrochemical sensor may be arranged such that a first electrochemical reaction involving the first analyte may occur at the first electrochemical sensor to enable detection of the first analyte. Similarly, the second electrochemical sensor may be arranged such that a second electrochemical reaction involving the second analyte may occur at the second electrochemical sensor to enable detection of the second analyte. A detailed example of a probe that may be used as part of system 100 is described below, with reference to FIGS. 4a-4c.

The analyte detection system 100 further includes a first potentiostat 106 and a second potentiostat 108. The first potentiostat 106 is electrically connected to the first electrochemical sensor on the probe 102 via a first cable 110. In particular, the first potentiostat 106 is electrically connected to electrodes of the first electrochemical sensor, so that the first potentiostat 106 can perform a first electrochemical measurement with the first electrochemical sensor, e.g. by controlling a voltage and/or current applied to the first electrochemical sensor. Similarly, the second potentiostat 108 is electrically connected to the second electrochemical sensor on the probe 102 via a second cable 112. The second potentiostat 108 is electrically connected to electrodes of the second electrochemical sensor, so that the second potentiostat 108 can perform a second electrochemical measurement with the second electrochemical sensor, e.g. by controlling a voltage and/or current applied to the second electrochemical sensor. The first and second cables 110, 112 are combined into a single cable 114 in a vicinity of the probe 102, to facilitate connection to the probe 102.

The first potentiostat 106 and the second potentiostat 108 may be any suitable potentiostat for performing electrochemical measurements. A wide range of commercially available off-the-shelf potentiostats may be used for this purpose. By way of example, the EmStat3 potentiostat (marketed by PalmSens) may be a suitable potentiostat.

The analyte detection system 100 further includes a control system in the form of a computing device 116. In the example shown, the computing device 116 is a laptop computer, however other types of computing device may also be used, such as a desktop computer, a tablet computer or a smartphone. The computing device 116 is communicatively coupled to each of the first potentiostat 106 and the second potentiostat 108 via a respective wired connection. In this manner, the computing device 116 may transmit data to, and receive data from, the first and second potentiostats 106, 108. An isolator circuit 118 is connected between the computing device 116 and the first potentiostat 106. More specifically, a third cable 120 is connected between the computing device 116 and the isolator circuit 118, and a fourth cable 122 is connected between the isolator circuit 118 and the first potentiostat 106. In contrast, the computing device 116 is directly connected to the second potentiostat 108 via a fifth cable 124.

The isolator circuit 118 is configured to enable communication between the first potentiostat 106 and the computing device 116, whilst electrically isolating the first potentiostat 106 from the computing device 116. In this manner, data may be transmitted between the first potentiostat 106 and the computing device 116 whilst keeping the first potentiostat electrically isolated from the computing device 116. This may avoid the first potentiostat 106 and the second potentiostat 108 being electrically connected via the computing device 116. The isolator circuit 118 may include one or more transformers which are configured to communicate electrical signals between a first end and a second end of the isolator circuit 118, whilst electrically isolating the first and second ends of the isolator circuit 118 from one another.

The wired connections between the computing device 116 and the first and second potentiostats 106, 108 may be any suitable wired connection for enabling communication between the computing device 116 and the first and second potentiostats 106, 108. For example, the first potentiostat 106 and the second potentiostat 108 may be connected to the computing device via respective USB interfaces on the computing device 116. Then, the third cable 120, fourth cable 122 and fifth cable 124 may be USB cables, and the isolator circuit 118 may be a USB isolator. As an example, the USB isolator manufactured by Olimex (Manufacturer Part number: USB-ISO), or the USB isolator manufactured by Acromag (Manufacturer part number: 4001-112) may be used for the isolator circuit 118. Of course, other types of wired communication interfaces (e.g. other than USB) may be used for enabling communication between the computing device 116 and the first and second potentiostats 106, 108.

The computing device 116 is configured to control the first potentiostat 106 and the second potentiostat 108. For example, the computing device 116 may include software installed thereon for controlling the first and second potentiostats 106, 108. In this manner, the computing device 116 may control a first electrochemical measurement performed by the first potentiostat 106 with the first electrochemical sensor on the probe 102, and a second electrochemical measurement performed by the second potentiostat 108 with the second electrochemical sensor on the probe 102. For example, the computing device 116 may be configured to transmit respective control signals to the first and second potentiostats 106, 108, which respectively include indications of measurement parameters for the first and second electrochemical measurements. The computing device 116 may further be configured to receive measurement data from the first and second potentiostats 106, 108, the measurement data being indicative of results of the first and second electrochemical measurements. The computing device 116 includes an input interface (e.g. mouse and keyboard) which enables a user to set parameters for the first and second electrochemical measurements, as well as a display (e.g. screen) for displaying results of the first and second electrochemical measurements.

The first potentiostat 106 is configured to transmit a first output signal including measurement data indicative of results of the first electrochemical measurement to the computing device 116. Similarly, the second potentiostat 108 is configured to transmit a second output signal including measurement data indicative of results of the second electrochemical measurement to the computing device 116. The first output signal is conveyed via cables 120, 122 and the isolator circuit 118, whilst the second output signal is conveyed via cable 124. Due to the connection of the isolator circuit 118 between the first potentiostat 106 and the computing device, interference (or cross-talk) between the first output signal and the second output signal may be avoided.

The computing device 116 includes an internal battery (e.g. a rechargeable battery) for powering the computing device 116. The computing device 116 may be connectable to an external power source (e.g. mains power), in order to charge its internal battery. Then, when performing electrochemical measurements with the first and second potentiostats 106, 108 the computing device 116 may be disconnected from any external power source, such that it is entirely battery-powered during the electrochemical measurements. The inventors have found that using a battery-powered computing device which is not connected to any external power source during the measurements may serve to avoid cross-talk between the first and second electrochemical measurements.

In some embodiments, the first and second potentiostats 106, 108 may be powered by the computing device 116, i.e. via the wired connections between computing device 116 and the first and second potentiostats 106, 108. For example, where the computing device 116 is connected to the first and second potentiostats 106, 108 via USB connections, power may be conveyed from the computing device to each of the first and second potentiostats 106, 108 via the corresponding USB cables. In such a case, the isolator circuit 118 may be configured to enable power transmission from the computing device 116 to the first potentiostat 106 (e.g. via one or more transformers in the isolator circuit 118), whilst keeping the first potentiostat 106 electrically isolated from the computing device. Powering the first and second potentiostats 106, 108 with the computing device 116 may serve to ensure that the first potentiostat 106 is effectively isolated from the second potentiostat 108. Moreover, this may avoid having to connect the first and second potentiostats 106, 108 to an external power source (e.g. mains power), which could result in cross-talk between the first and second electrochemical measurements (e.g. due to a ground loop in the system).

Additionally or alternatively, the first and second potentiostats 106, 108 may be battery-powered, e.g. the first and second potentiostats 106, 108 may each include an internal power source in the form of a battery (e.g. rechargeable battery). In this manner, the first and second potentiostats 106,108 may each have a dedicated power source. This may serve to ensure that there is no electrical connection between the first and second potentiostats 106, 108, thus avoiding any risk of cross-talk between the first and second electrochemical measurements. Where the first and second potentiostats 106, 108 are battery-powered, they may also receive power from the computing device 116, e.g. to recharge their respective batteries.

Using the analyte detection system 100, it is possible to simultaneously perform the first electrochemical measurement with the first potentiostat 106 and the second electrochemical measurement with the second potentiostat 108, without significant cross-talk or interference between the two measurements. This promotes accurate simultaneous detection of the first and second analyte within the same sample 104. The first and second analytes may be different analytes that are to be detected within the sample 104. In some cases however, the first and second analytes may correspond to a same analyte, such that the analyte detection system 100 enables detection of a particular analyte of interest via two simultaneous electrochemical reactions.

The first and second electrochemical measurements performed by the first and second potentiostats 106, 108, respectively, are controlled by the computing device 116, and may be tailored to the specific analytes of interest. For example, the first and second potentiostats 106, 108 may be used to perform a voltammetry measurement (e.g. cyclic voltammetry, sampled DC voltammetry, pulse voltammetry, square-wave voltammetry) and/or an amperometry measurement (e.g. chronoamperometry). The first and second potentiostats 106, 108 may be both be configured to perform a same type of electrochemical measurement; alternatively they may be configured to perform different types of electrochemical measurement. As noted above, the first and second electrochemical measurements may be performed simultaneously. However, it is also possible to perform the first and second electrochemical measurements sequentially, e.g. one after the other. This may further reduce the risk of cross-talk between the measurements. Examples of electrochemical measurements that may be performed with the analyte detection system 100 are described below with respect to FIGS. 5 and 6, which illustrate a voltammetry measurement for detecting skatole and a chronoamperometry measurement for detecting androstenone, respectively.

In the example shown in FIG. 1, the sample 104 is a solution into which the probe 102 is inserted. The solution may include one or more analytes of interest, which are to be detected via the first and second electrochemical measurements. However, other types of sample may also be used with the analyte detection system 100. For example, in some cases the probe may be directly inserted into a sample of food or biological tissue. Where the analyte detection system 100 is used in the meat (e.g. pig) industry, the sample may include a live animal, a sample from the live animal, an animal carcass, a sample from the animal carcass, a meat product, or a sample of the meat product.

Figure 2:
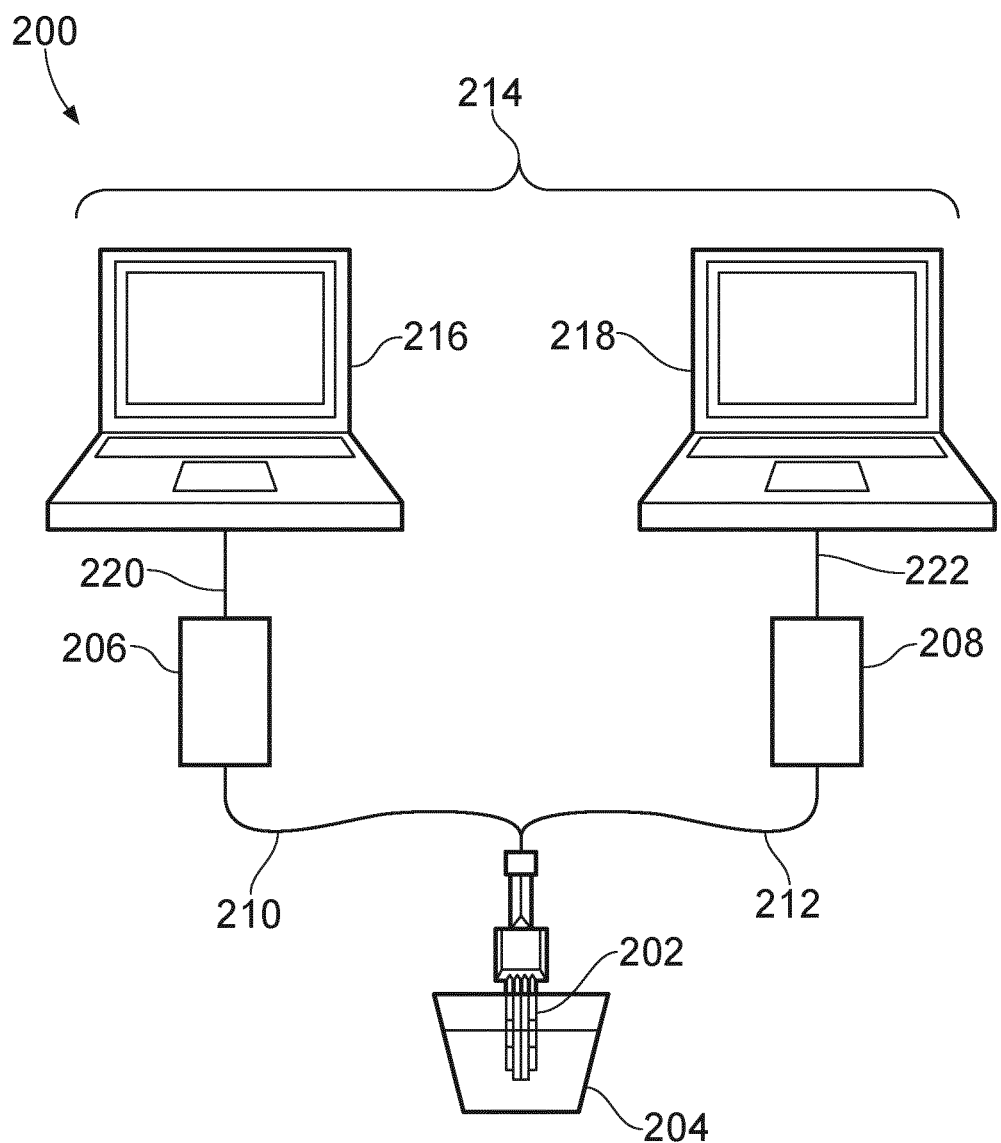
FIG. 2 is a schematic diagram illustrating an analyte detection system according to an embodiment of the invention.

FIG. 2 shows a schematic diagram of an analyte detection system 200 that is an embodiment of the invention. The analyte detection system 200 is based on similar principles to analyte detection system 100 described above, and similarly enables simultaneous detection of two analytes within a single sample.

The analyte detection system 200 includes a probe 202 configured for insertion into a sample 204, the probe 202 having a first electrochemical sensor and a second electrochemical sensor disposed thereon. The analyte detection system 200 further includes a first potentiostat 206 which is electrically connected to the first electrochemical sensor via a first cable 210, and a second potentiostat 208 which is electrically connected to the second electrochemical sensor via a second cable 212. The probe 202, the first potentiostat 206 and the second potentiostat 208 respectively operate in a similar manner to the probe 102, the first potentiostat 106 and the second potentiostat 108 described above in relation to the analyte detection system 100, and therefore are not described in detail again.

The analyte detection system 200 further includes a control system 214, the control system 214 comprising a first controller 216 and a second controller 218. The first controller 216 is communicatively coupled to the first potentiostat 206 via a third cable 220, whilst the second controller 218 is communicatively coupled to the second potentiostat 208 via a fourth cable 222. For example, the first potentiostat 206 may be connected to the first controller via a USB connection (i.e. the third cable 220 may be a USB cable) and the second potentiostat 208 may be connected to the second controller 218 via a USB connection (i.e. the fourth cable 222 may be a USB cable). Of course, other types of connection interface may be used for connecting the first potentiostat 206 to the first controller 216 and the second potentiostat 208 to the second controller 218. In the example shown, the first controller 216 and the second controller 218 are each implemented by a respective laptop computer; however, other types of computing device may be used for the first and/or second controller, such as a desktop computer, tablet computer or smartphone.

The first controller 216 is configured to control the first potentiostat 206, whilst the second controller 218 is configured to control the second potentiostat 218. For example, the first and second controllers 216, 218 may include software installed thereon for controlling the first and second potentiostats 206, 208, respectively. In this manner, the first controller 216 may control a first electrochemical measurement performed by the first potentiostat 206 with the first electrochemical sensor on the probe 202, and the second controller 218 may control a second electrochemical measurement performed by the second potentiostat 208 with the second electrochemical sensor on the probe 202. The first and second controllers 216, 218 may be configured to transmit respective control signals to the first and second potentiostats 206, 208, which respectively include indications of measurement parameters for the first and second electrochemical measurements. The first controller 216 may then receive measurement data from the first potentiostat 206 which is indicative of results of the first electrochemical measurement, and the second controller 218 may receive measurement data from the second potentiostat 208 which is indicative of results of the second electrochemical measurement.

Each of the first controller 216 and the second controller 218 includes an internal power source in the form of an internal battery (e.g. a rechargeable battery). The first and second controllers 216, 218 may be connected to an external power source (e.g. mains power) to recharge their internal batteries. Then, when performing electrochemical measurements, the first and second controllers 216, 218 may be disconnected from the external power source, such that they are entirely battery-powered during the electrochemical measurements. This may serve to ensure that the first controller 216 and the second controller 218 are electrically isolated from another, and avoid cross-talk between the first and second electrochemical measurements.

By using two separate controllers for independently controlling the first and second potentiostats 206, 208, cross-talk or interference between the first and second electrochemical measurements may be minimised, thus enabling accurate and simultaneous detection of the first and second analytes. Using separate controllers for the first and second potentiostats 206,208, may avoid there being an electrical path between the first and second potentiostats 206, 208 via the control system 214. As a result, no isolator circuit may be required in the analyte detection system 200.

The first potentiostat 206 is configured to transmit a first output signal including measurement data indicative of results of the first electrochemical measurement to the first controller 216. Similarly, the second potentiostat 208 is configured to transmit a second output signal including measurement data indicative of results of the second electrochemical measurement to the second controller 218. The first output signal is conveyed via cable 220, whilst the second output signal is conveyed via cable 222. As the first controller 216 and the second controller 218 are separate with no electrical connection between them, interference (or cross-talk) between the first output signal and the second output signal may be avoided.

Figure 3:
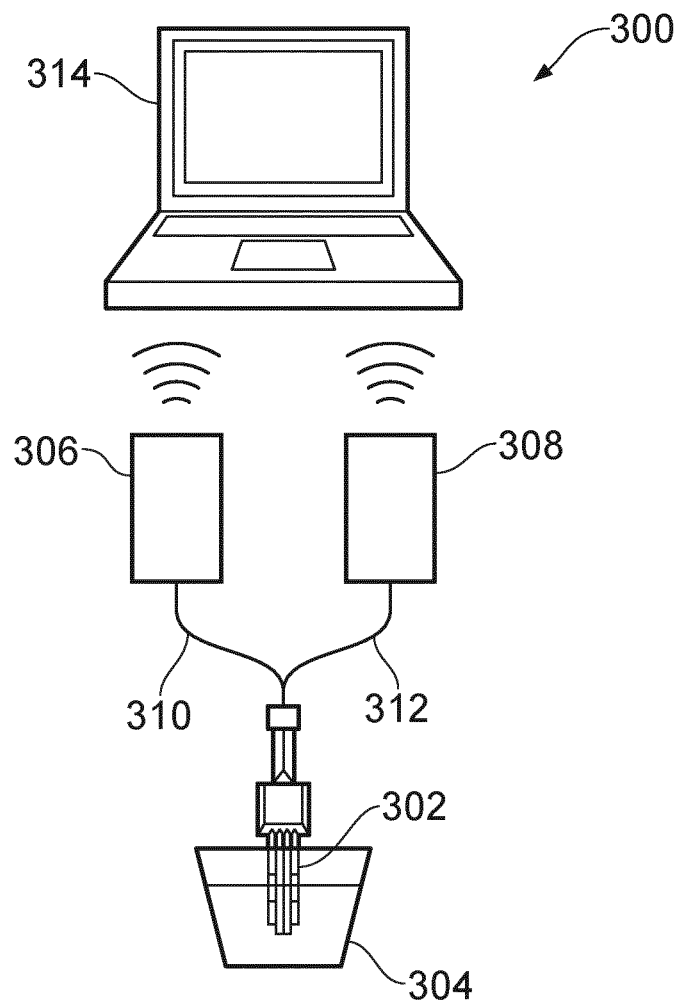
FIG. 3 is a schematic diagram illustrating an analyte detection system according to an embodiment of the invention.

FIG. 3 shows a schematic diagram of an analyte detection system 300 that is an embodiment of the invention. The analyte detection system 300 is based on similar principles to analyte detection system 100 described above, and similarly enables simultaneous detection of two analytes within a single sample.

The analyte detection system 300 includes a probe 302 configured for insertion into a sample 304, the probe 302 having a first electrochemical sensor and a second electrochemical sensor disposed thereon. The analyte detection system 300 further includes a first potentiostat 306 which is electrically connected to the first electrochemical sensor via a first cable 310, and a second potentiostat 308 which is electrically connected to the second electrochemical sensor via a second cable 312. The probe 302, the first potentiostat 306 and the second potentiostat 308 respectively operate in a similar manner to the probe 102, the first potentiostat 106 and the second potentiostat 108 described above in relation to the analyte detection system 100, and therefore are not described in detail again.

The analyte detection system further includes a control system in the form of a computing device 314. The computing device 314 is communicatively coupled to the first potentiostat 306 and the second potentiostat 308. Thus, similarly to the computing device 116 of analyte detection system 100 described above, the computing device 314 may control a first electrochemical measurement performed by the first potentiostat 306 with the first electrochemical sensor on the probe 302, and a second electrochemical measurement performed by the second potentiostat 308 with the second electrochemical sensor on the probe 302.

However, rather than using wired connections (as in analyte detection system 100), the computing device 314 is in wireless communication with the first and second potentiostats 306, 308. Thus, the computing device 314 includes a wireless communication interface for communicating with corresponding wireless communication interfaces in the first and second potentiostats 306, 308. Any suitable wireless communication protocol may be used for wireless communication between the computing device 314 and the first and second potentiostats 306, 308, such as Bluetooth or Wi-Fi. Thus, the computing device 314 may wirelessly transmit control signals to the first and second potentiostats 306, 308 for controlling the first and second electrochemical measurements, and wirelessly receive measurement data from the first and second potentiostats 306, 308. An example of a potentiostat configured for wireless communication and which may be used in the analyte detection system is the EmStat3 Blue potentiostat (manufactured by PalmSens).

As the computing device 314 is in wireless communication with the first and second potentiostats 306, 308, it is possible to avoid any electrical connections between the computing device 314 and the first and second potentiostats 306, 308. This may serve to avoid cross-talk between the first and second electrochemical measurements, thus enabling accurate and simultaneous detection of first and second analytes within the sample 304. In the embodiment of FIG. 3, as there are no wired connections between the computing device 314 and the first and second potentiostats 306, 308, the first and second potentiostats 306, 308 may not be powered by the computing device 314. Accordingly, each of the first potentiostat 306 and the second potentiostat 308 includes an internal power source in the form of an internal battery (e.g. rechargeable battery).

The first potentiostat 306 is configured to transmit a first output signal including measurement data indicative of results of the first electrochemical measurement to the computing device 314. Similarly, the second potentiostat 108 is configured to transmit a second output signal including measurement data indicative of results of the second electrochemical measurement to the computing device 314. The first output signal is transmitted wirelessly from the first potentiostat 306, whilst the second output signal is transmitted wirelessly from the second potentiostat 308. As the first and second output signals are transmitted wirelessly to the computing device 314, and as there are no electrical connections between the first and second potentiostats 306, 308, interference (or cross-talk) between the first output signal and the second output signal may be avoided.

Although in the embodiments of FIGS. 1 to 3 described above, the first and second potentiostats are connected to the control system using similar connection methods, in other embodiments (not shown) different connection methods may be used for connecting the control system to the first and second potentiostats. For example, in some embodiments, the control system may be wirelessly connected to the first potentiostat, and connected to the second potentiostat via a wired (e.g. USB) connection.

The analyte detection systems of FIGS. 1 to 3 described above are configured to enable detection of two analytes within a single sample. However, in further embodiments, an analyte detection system may be configured to detect more than two analytes. In such an embodiment, the number of electrochemical sensors on the probe may be increased to match the number of analytes to be detected. Similarly, the number of potentiostats may be increased, such that each electrochemical sensor is electrically connected to a respective potentiostat. Each of the respective potentiostats may be electrically isolated from the others, to avoid cross-talk between the different measurements. For example, the embodiment of FIG. 3 may be modified to include more than two potentiostats, each of which is wirelessly connected to the computing device 314. The embodiment of FIG. 2 may be modified to include more than two potentiostats, with each potentiostat being connected to a respective controller. Where the embodiment of FIG. 1 is modified to include more than two potentiostats, isolator circuits may be placed at appropriate locations to avoid cross-talk between the measurements via the computing device 116.

Figure 4A:
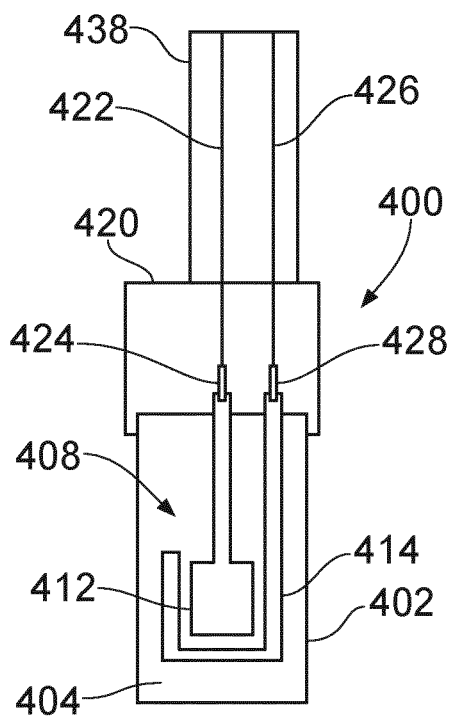
FIG. 4a is a schematic diagram of a probe for an analyte detection system, the probe being an embodiment of the invention, where
Figure 4B:
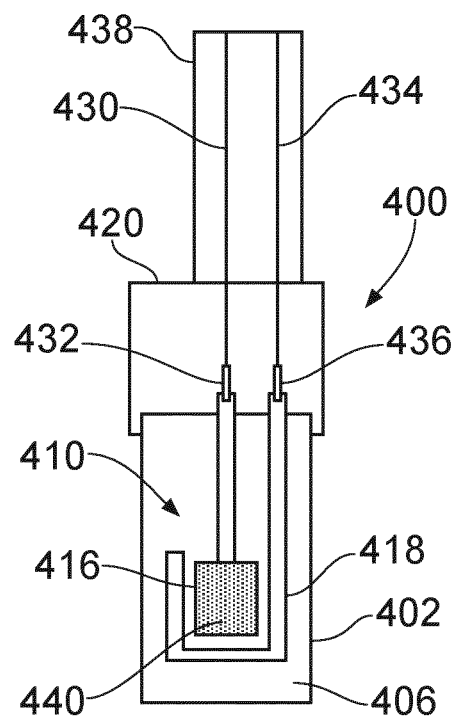
FIG. 4b is a schematic diagram of the probe of FIG. 4a showing a view of a second side of the probe which is opposite the first side.
Figure 4C:
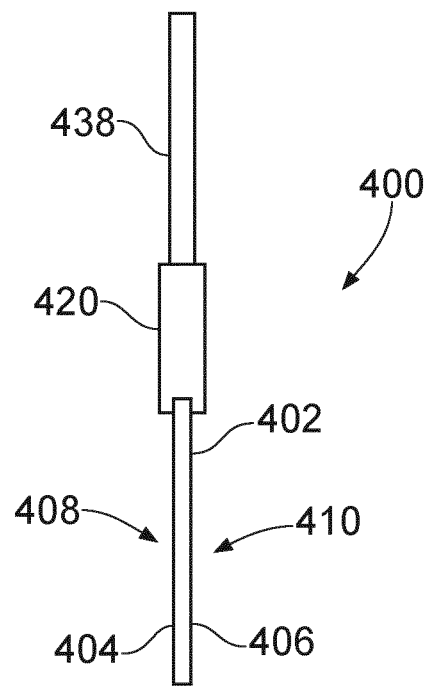
FIG. 4c is a schematic diagram of the probe of FIG. 4a showing a side-on view of the probe.

FIGS. 4a-4c illustrate a probe 400 that is an embodiment of the invention. The probe 400 may be used as part of an analyte detection system according to the invention. For example, the probe 400 may correspond to any one of probe 102, probe 202 and probe 302 discussed above. The probe 400 is designed to enable two electrochemical measurements to be performed simultaneously, thus enabling simultaneous detection of two analytes within a single sample. The probe 400 includes a support material in the form of a substrate 402. The substrate 402 defines a first surface 404 which is on a first side of the probe 400 (FIG. 4a), and a second surface 406 which is on a second side of the probe 400 (FIG. 4b), opposite to the first side. FIG. 4c shows a side-on view of the probe 400.

A first electrochemical sensor 408 is disposed on the first surface 404 of the substrate 402, whilst a second electrochemical sensor 410 is disposed on the second surface of the substrate 402. Both the first electrochemical sensor 408 and the second electrochemical sensor 410 have a two-electrode configuration. Thus, the first electrochemical sensor 408 includes a first working electrode 412 and a first reference electrode 414, whilst the second electrochemical sensor 410 includes a second working electrode 416 and a second reference electrode 418. The first working electrode 412 and the second working electrode 416 may each have an area of around 3 mm$^2$. The first and second reference electrodes 414, 418 are arranged such that they are disposed around portions of the first and second working electrodes 412, 416, respectively, e.g. they may be referred to as having a "hockey-stick" shape. In some cases, an insulating material (e.g. insulating tape) may be placed over a portion of the first (and/or second) working electrode, in order to define an active area of the working electrode. Of course, other electrode shapes and configurations may also be used.

The electrodes of the first and second electrochemical sensors 408, 410 may be made of metal, e.g. gold, platinum or silver, and/or carbon materials. In some embodiments, the electrodes may be screen-printed electrodes, e.g. they may be screen-printed onto the substrate 402. For example, the electrodes may include screen-printed carbon electrodes (SPCEs) which are made using commercially available carbon ink. In one embodiment, the first reference electrode 414 and the second reference electrode 418 may be screen-printed Ag/AgCl electrodes made using an Ag/AgCl ink, whilst the first working electrode 412 and the second working electrode 416 may be SPCEs. For example, an Ag:AgCl ratio of the Ag/AgCl reference electrodes may be 60:40, e.g. the Ag/AgCl reference electrodes may be screen-printed using an Ag/AgCl ink having an Ag:AgCl ratio of 60:40. The SPCEs may be made using a carbon ink such as C2030519P4, as sold by SunChemical Gwent Group.

The substrate 402 may be made of any suitable insulating material, to ensure that the electrodes are electrically isolated from one another, and that the first and second electrochemical sensors 408, 410 are electrically isolated from one another. For example, the substrate 402 may be made of a ceramic material, or a plastic material such as polyvinyl chloride (PVC). In some cases, the first electrochemical sensor 408 and the second electrochemical sensor 410 may be formed on separate substrates (e.g. they may be screen-printed onto separate substrates), which are then secured together in a back-to-back configuration to form the substrate 402. In other words, the substrate 402 need not necessarily be formed by a single piece of material. As can be seen in FIG. 4c, the substrate 402 is substantially flat. This may facilitate insertion of the substrate 402 into a sample.

A top end of the substrate 402 is held in a substrate holder 420 which is made of an electrically insulating material. Respective conductive strips extend from each of the electrodes to the top end of the substrate, to facilitate electrical connection to the electrodes. The first working electrode 412 is electrically connected to a first wire 422 via a first connector 424 disposed in the holder 420, and the first reference electrode 414 is electrically connected to a second wire 426 via a second connector 428 in the holder 420. Similarly, the second working electrode 416 is electrically connected to a third wire 430 via a third connector 432 disposed in the holder 420, and the second reference electrode 418 is electrically connected to a fourth wire 434 via a fourth connector 436 in the holder 420. The connectors 424, 428, 432, 436 may be any suitable type of electrical connector. For example, the first connector 424 may be in the form of clip connector mounted at the end of the wire 422, and arranged to clip onto the first working electrode 412 (and similarly for the other connectors).

The wires 422, 426, 430 and 434 exit the probe via a cable 438 which is secured to the holder 420. For example, the cable 438 may correspond to the cable 114 shown in FIG. 1. The cable 438 may include an insulating sheath, to protect the wires 422, 426, 430 and 434. Away from the probe 400, the cable 438 may split into two separate cables (not shown), the first of which may be connected to a first potentiostat, and the second of which may be connected to a second potentiostat. In particular, the first and second wires 422, 426 may be electrically connected to the first potentiostat so that the first potentiostat can perform a first electrochemical measurement with the first electrochemical sensor 408, and the third and fourth wires 430, 434 may be electrically connected to the second potentiostat so that the second potentiostat can perform a second electrochemical measurement with the second electrochemical sensor 410.

In the example shown, the first electrochemical sensor 408 and the second electrochemical sensor 401 have a two-electrode configuration. Thus, the reference electrode of each electrochemical sensor may act as a combined reference and counter electrode. However, in other embodiments (not shown), a three-electrode configuration may be used, where a separate counter electrode is provided. In such an embodiment, the first electrochemical sensor 408 may further include a first counter electrode disposed on the first surface 404 of the substrate 402, and the second electrochemical sensor 410 may further include a second counter electrode disposed on the second surface 406 of the substrate 402.

The first electrochemical sensor 408 is configured to detect a first analyte, whilst the second electrochemical sensor 410 is configured to detect a second analyte. In particular, the first electrochemical sensor 408 may be arranged such that a first electrochemical reaction involving the first analyte takes place at the first electrochemical sensor 408 when a first electrochemical measurement is performed. Similarly, the second electrochemical sensor 410 may be arranged such that a second electrochemical reaction involving the second analyte takes place at the second electrochemical sensor 410 when a second electrochemical measurement is performed. In some cases, this may be achieved by providing a reactant and/or enzyme on the electrochemical sensor, the reactant and/or enzyme being configured to participate in a reaction with the analyte of interest.

Figure 5A:
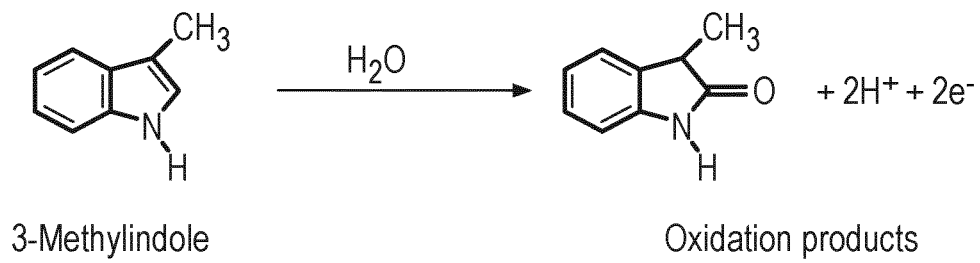
FIG. 5a is a diagram illustrating an electrochemical reaction involving skatole that may take place at an electrochemical sensor on a probe according to the invention.

In one embodiment, the first electrochemical sensor 408 is configured to detect skatole, whilst the second electrochemical sensor 410 is configured to detect androstenone. The first electrochemical sensor 408 may detect presence of skatole in a sample by direct oxidation of the skatole at the surface of the first working electrode 412. FIG. 5a illustrates the electrochemical oxidation of a skatole molecule (3-methylindole) to 3-methyl2-oxindole. This electrochemical oxidation of the skatole may result in a voltammetric response at the first working electrode 412 (see e.g. measurements described with reference to FIG. 6), which enables skatole to be detected and quantified.

The second electrochemical sensor 410 may comprise NADH or NADPH and an enzyme that metabolises androstenone in the presence of NADH or NADPH. For example, the enzyme may be 3-hydroxysteroid dehydrogenase (3-HSD). When the 3-HSD comes into contact with androstenone in the sample, the androstenone is reduced to androstenol and the NADH or NADPH is oxidised to $NAD^+$ or $NADP^+$. This redox reaction may enable a change in concentration of the NADH or NADPH to be detected as a change in current across the second electrochemical sensor 410, with the change in concentration of the NADH or NADPH being proportional to the concentration of androstenone in the sample.

The NADH or NADPH and 3-HSD may be provided on one of the electrodes of the second electrochemical sensor 410, e.g. on the second working electrode 416 as illustrated by the shaded area 440 in FIG. 4b. The NADH or NADPH and 3-HSD may be deposited and immobilised on the second working electrode 416 via various mechanisms, such as drying them onto the surface of the electrode, entrapping them in a membrane on the surface of the electrode, or chemically cross-linking them directly onto the surface of the electrode. In some embodiments, the second working electrode 416 may further comprise a redox mediator. Using a redox mediator may be beneficial, as it improve sensitivity of the electrochemical measurement, as well as enable a lower voltage to be used for the electrochemical measurement compared to a case where no redox mediator is used. Meldola's blue (7-dimethylamino-1,2-benzophenoxazine) is an example of a suitable redox mediator, which can be integrated into a screen-printing ink used to make the second working electrode 416. For example, the second working electrode 416 may be a SPCE containing Meldola's Blue. Other mediators which can be used in the above reaction scheme include phenoxazines and phenazines as well as other similar classes of redox species.

Figure 5B:
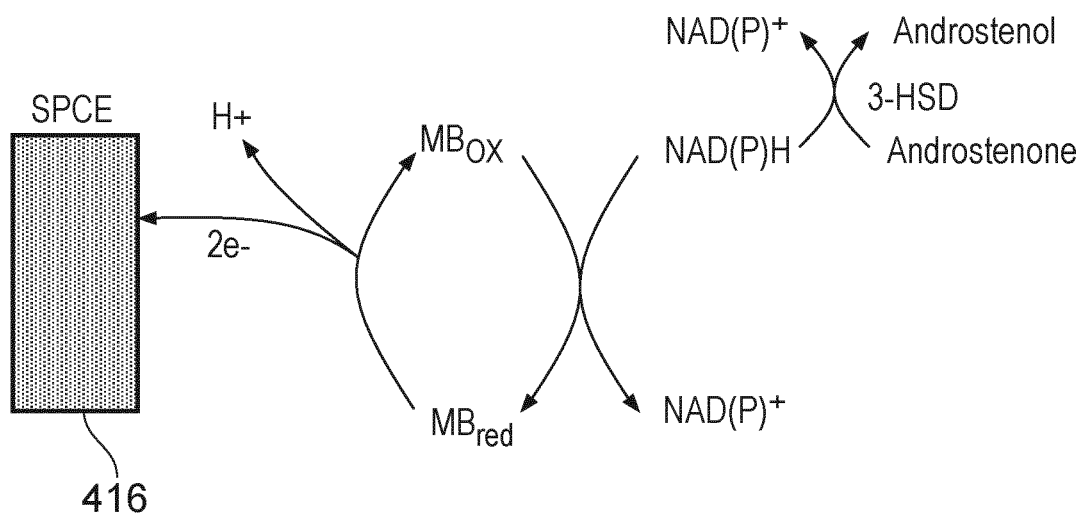
FIG. 5b is a diagram illustrating an electrochemical reaction involving androstenone that may take place at an electrochemical sensor on a probe according to the invention.

FIG. 5b illustrates a reaction sequence involving androstenone that may occur at the second working electrode 416 during an electrochemical measurement performed with the second electrochemical sensor 410. In the example of FIG. 5b, the second working electrode 416 is a SPCE comprising redox mediator Meldola's Blue (MB), and $MB_{ox}$ and $MB_{red}$ refer to oxidised and reduced forms of Meldola's Blue, respectively. As can be seen in FIG. 5b, in the presence of 3-HSD, androstenone is reduced to androstenol and the NADH or NADPH is oxidised to $NAD^+$ or $NADP^+$. An electrochemical reaction then occurs by the interaction of NADH or NADPH with $MB_{ox}$ to form $MB_{red}$. This is followed by an electrochemical oxidation of $MB_{red}$ at the surface of the second working electrode 416, which produces a response signal at the second working electrode 416. In FIG. 5b, NAD(P)H is used to refer to NADH or NADPH, and $NAD(P)^+$ is used to refer to $NAD^+$ or $NADP^+$. An example of electrochemical measurements for detecting androstenone are described below, in relation to FIG. 7.

Figure 6:
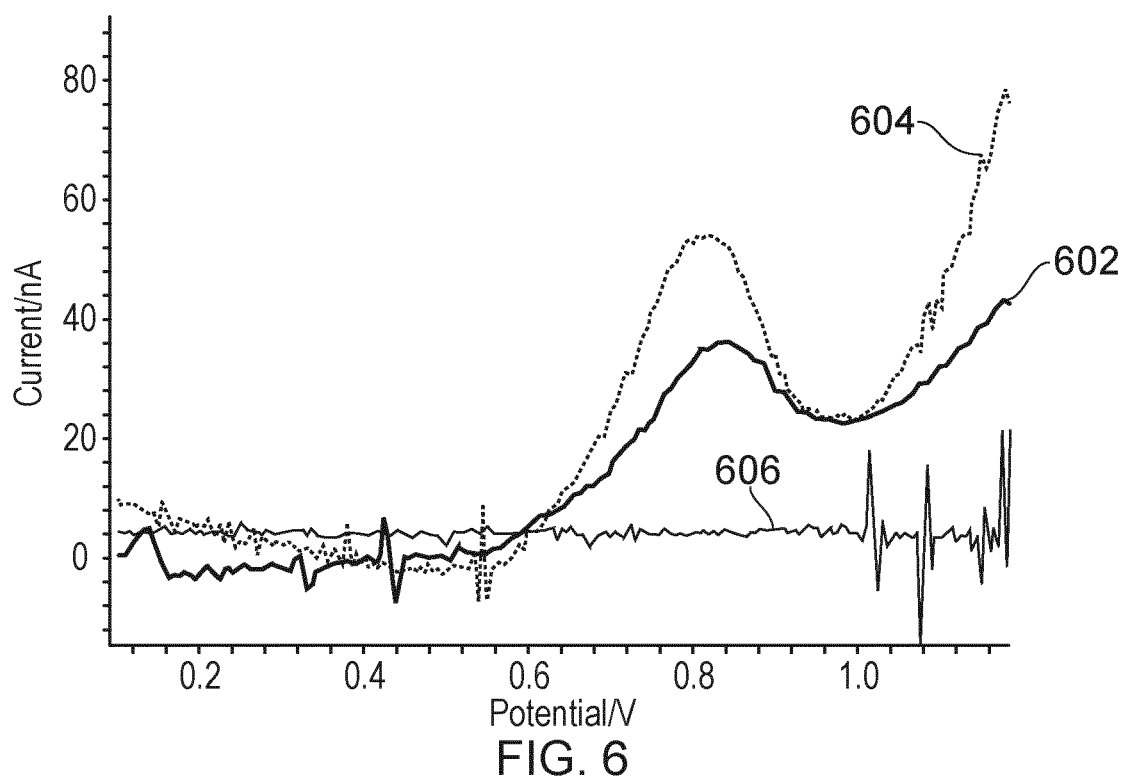
FIG. 6 is a graph showing results of differential pulse voltammetry measurements performed on a sample of porcine adipose tissue.

FIG. 6 shows results of differential pulse voltammetry measurements performed in a sample of porcine adipose tissue, for detecting skatole in the sample. The differential pulse voltammetry measurements were performed with a probe having the configuration of probe 400 described above, using the first electrochemical sensor 408 of the probe 400. The probe was inserted into the sample of adipose tissue by making an incision in the adipose tissue and inserting the probe into the incision. The working electrode of the first electrochemical sensor used for the measurements was an SPCE, and the reference electrode was a screen-printed Ag/AgCl electrode, with an Ag:AgCl ratio of 60:40. In the differential pulse voltammetry measurements, a waveform including a series of voltage pulses having a set magnitude relative to a linearly increasing ramp was applied to the first electrochemical sensor, and the resulting current was measured.

The curve indicated by reference numeral 602 corresponds to a case where the differential pulse voltammetry measurement was performed independently, i.e. there was no other electrochemical measurement performed simultaneously on the sample. The curve indicated by reference numeral 604 corresponds to a measurement performed using the analyte detection system 100, where a chronoamperometry measurement was performed simultaneously using the second electrochemical sensor on the probe. The curve indicated by reference numeral 606 corresponds to a case where a chronoamperometry measurement was performed simultaneously using the second electrochemical sensor on the probe, using a modified version of the analyte detection system 100 where no isolator circuit is connected between the computing device 116 and the first potentiostat 106 (i.e. the computing device 116 is directly connected to the first potentiostat 106 via a cable).

Figure 8:
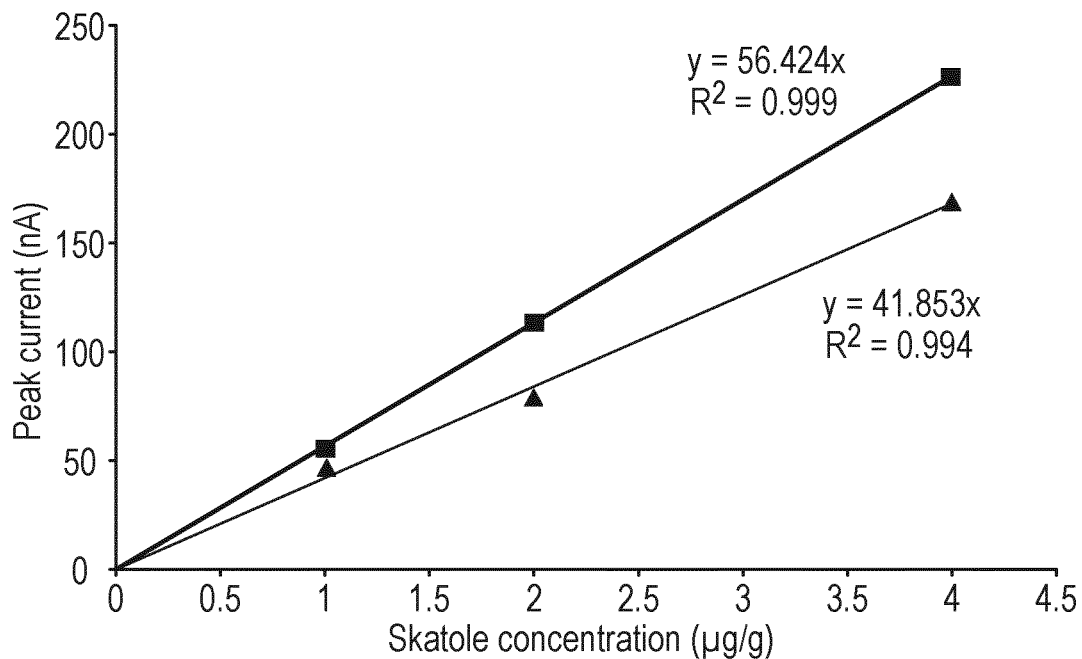
FIG. 8 is a calibration graph showing results from differential pulse voltammetry measurements obtained at different skatole concentrations.

As can be seen from FIG. 6, curves 602 and 604 show a current peak in the measured current vs. potential. The height of the peak is proportional to skatole concentration, as illustrated in FIG. 8, and so can be used to detect and quantify skatole in the sample. However, as shown by curve 606, in the case where no isolator circuit is used in the setup of analyte detection system 100, no current peak is observed in the signal, such that skatole cannot be detected or quantified. The absence of a current peak in curve 606 may be due to cross-talk or interference between the voltammetry and chronoamperometry measurements that were performed simultaneously. As shown by curve 604, placing the isolator circuit 118 between the computing device 116 and the first potentiostat effectively eliminates cross-talk or interference between the two measurements, such that a clearly distinguishable response signal is obtained from the voltammetry measurement. Similar results to curve 602 may also be obtained using analyte detection systems 200 or 300. Thus, the analyte detection system of the invention may enable a voltammetry measurement to be effectively performed, whilst simultaneously performing another electrochemical measurement in the sample.

Figure 7:
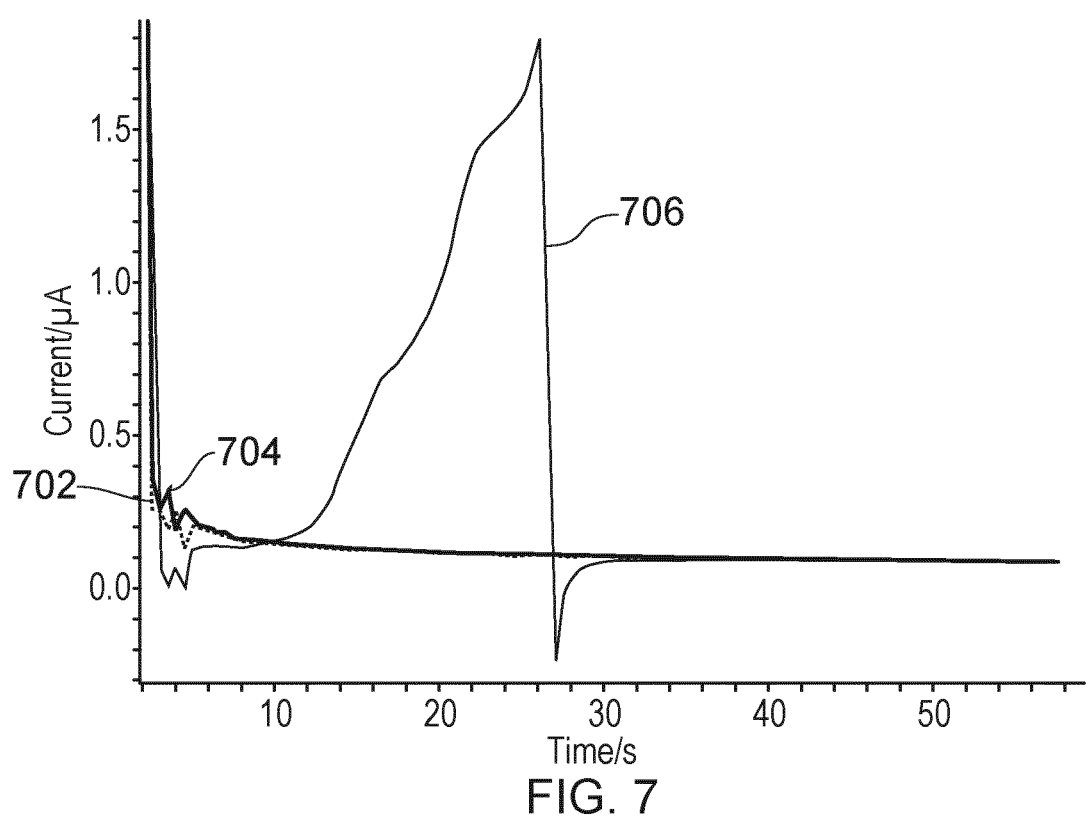
FIG. 7 is a graph showing results of chronoamperometry measurements performed on a sample of porcine adipose tissue.

FIG. 7 shows the results of chronoamperometry measurements performed in a sample of porcine adipose tissue, for detecting androstenone in the sample. The chronoamperometry measurements were performed with a probe having the configuration of probe 400 described above, using the second electrochemical sensor 410 of the probe 400. The probe was inserted into the sample of adipose tissue by making an incision in the adipose tissue and inserting the probe into the incision. The working electrode of the second electrochemical sensor used for the measurements was an SPCE including Meldola's Blue, and the reference electrode was a screen-printed Ag/AgCl electrode, with an Ag:AgCl ratio of 60:40. The working electrode included NADH and 3-HSD immobilised thereon. In the chronoamperometry measurements, a voltage applied across the second electrochemical sensor was stepped from an initial value to a final value, and the voltage was held at the final value for a predetermined period of time over which the resulting current was measured.

The curve indicated by reference numeral 702 corresponds to a case where the chronoamperometry measurement was performed independently, i.e. there was no other electrochemical measurement performed simultaneously on the sample. The curve indicated by reference numeral 704 corresponds to a measurement performed using the analyte detection system 100, where a voltammetry measurement was performed simultaneously using the first electrochemical sensor on the probe. In particular, curves 704 and 604 correspond to measurements that were performed simultaneously with the first and second electrochemical sensors on the probe. The curve indicated by reference numeral 706 corresponds to a case where a voltammetry measurement was performed simultaneously using the first electrochemical sensor on the probe, using a modified version of the analyte detection system 100 where no isolator circuit is connected between the computing device 116 and the first potentiostat 106 (i.e. the computing device 116 is directly connected to the first potentiostat 106 via a cable). In particular, curves 706 and 606 correspond to measurements that were performed simultaneously with the first and second electrochemical sensors on the probe.

Figure 9:
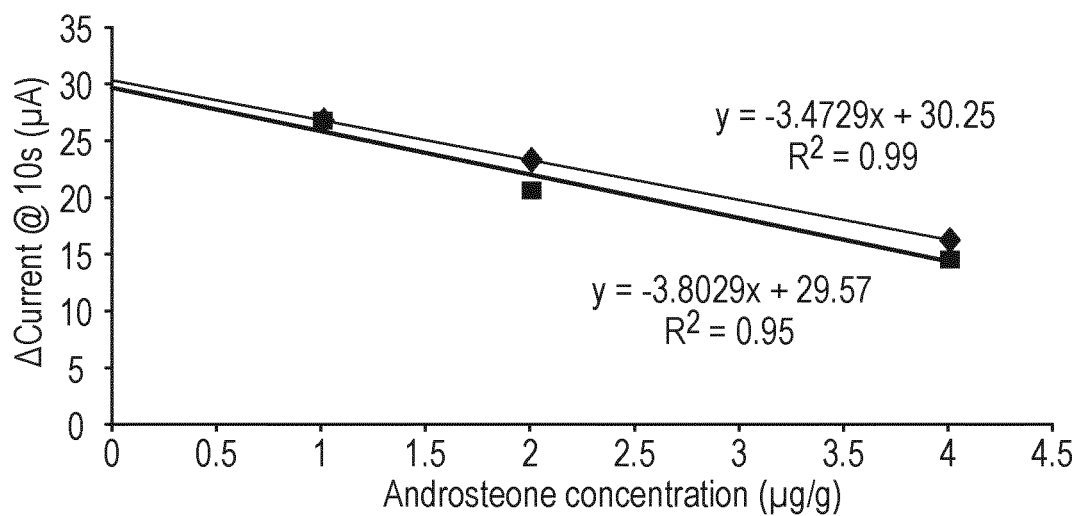
FIG. 9 is a calibration graph showing results from chronoamperometry measurements obtained at different androstenone concentrations.

As can be seen from FIG. 7, curves 702 and 704 show a decay of the measured current over time, which is a typical chronoamperometric response. As shown in FIG. 9, a magnitude of the change in current over time is proportional to androstenone concentration, and so can be used to detect and quantify androstenone in the sample. However, as shown by curve 706, in the case where no isolator circuit is used in the setup of analyte detection system 100, a signal from the voltammetry measurement interferes with the chronoamperometry measurement, preventing measurement of the chronoamperometric response. As demonstrated by curve 704, placing the isolator circuit 118 between the computing device 116 and the first potentiostat effectively eliminates cross-talk or interference between the two measurements, such that a clearly distinguishable response signal is obtained from the chronoamperometry measurement. Similar results to curve 702 may also be obtained using analyte detection systems 200 or 300. Thus, the analyte detection system of the invention may enable a chronoamperometry measurement to be effectively performed, whilst simultaneously performing another electrochemical measurement in the sample.

Together, FIGS. 6 and 7 (and in particular curves 604 and 704) indicate that two separate electrochemical measurements may be performed simultaneously at substantially the same location within a sample, thus enabling simultaneous detection of two different analytes within the sample.

FIG. 8 shows a calibration graph for skatole concentration in a sample. The calibration graph plots peak current measured in the differential pulse voltammetry measurements against skatole concentration. The measurements were obtained from subcutaneous adipose tissue fortified with 0 µg/g, 1 µg/g, 2 µg/g and 4 µg/g of androstenone. The two curves in FIG. 8 correspond to samples taken from two different pigs. The differential pulse voltammetry measurements were performed using the same setup as for curve 604 of FIG. 6 (i.e. with the analyte detection system 100 and probe 400). The differential pulse voltammetry measurements were performed simultaneously with chronoamperometry measurements on the sample. For each skatole concentration, the magnitude of the current peak in the voltammetry measurement was measured, and plotted against the corresponding skatole concentration. As can be seen from the curves in FIG. 8, the peak current from the voltammetry measurements is substantially proportional to skatole concentration, and so can be used to estimate skatole concentration in the sample.

FIG. 9 shows a calibration graph for androstenone concentration in a sample. The calibration graph plots a change in current measured in the chronoamperometry after 10 seconds (from when the applied voltage was stepped from an initial value to a final value) against androstenone concentration. The measurements were obtained from subcutaneous adipose tissue fortified with 0 µg/g, 1 µg/g, 2 µg/g and 4 µg/g of androstenone. The two curves in FIG. 9 correspond to samples taken from two different pigs. The chronoamperometry measurements were performed using the same setup as for curve 704 of FIG. 7 (i.e. with the analyte detection system 100 and probe 400). The chronoamperometry measurements were performed simultaneously with voltammetry measurements on the sample. For each androstenone concentration, the change in current over 10 seconds was measured, and plotted against the corresponding androstenone concentration. As can be seen from the curves in FIG. 9, the change in current for the chronoamperometry measurements is substantially proportional to androstenone concentration, and so can be used to estimate androstenone concentration in the sample.

In view of FIGS. 6-9, the present invention may enable different electrochemical measurements (e.g. voltammetry and chronoamperometry) to be performed simultaneously within a single sample, to enable detection and quantification of different analytes (e.g. skatole and androstenone) within the sample.

The invention claimed is:

1. An analyte detection system comprising:
a probe for insertion into a sample, the probe having a first electrochemical sensor configured to detect a first analyte in the sample, and a second electrochemical sensor configured to detect a second analyte in the sample;
a first potentiostat connected to the first electrochemical sensor and configured to perform a first electrochemical measurement with the first electrochemical sensor;
a second potentiostat connected to the second electrochemical sensor and configured to perform a second electrochemical measurement with the second electrochemical sensor; and
a control system that is communicatively coupled to the first potentiostat and the second potentiostat, wherein the control system is configured to control the first electrochemical measurement and the second electrochemical measurement, and wherein the control system is configured to receive measurement data from the first potentiostat and the second potentiostat,
wherein the first potentiostat and the second potentiostat are electrically isolated from one another, such that there is no electrical communication between the first potentiostat and the second potentiostat via the control system.

2. The analyte detection system according to claim 1, wherein the analyte detection system further comprises an isolator circuit connected between the control system and the first potentiostat.

3. The analyte detection system according to claim 2, wherein the isolator circuit comprises a USB isolator.

4. The analyte detection system according claim 1, wherein the first potentiostat is powered by the control system, and/or the second potentiostat is powered by the control system.

5. The analyte detection system according to claim 1, wherein the first potentiostat is battery-powered and/or the second potentiostat is battery-powered.

6. The analyte detection system according to claim 1, wherein the control system is configured to communicate wirelessly with the first potentiostat and/or the second potentiostat.

7. The analyte detection system according to claim 1, wherein the control system is battery-powered.

8. The analyte detection system according to claim 1, wherein the control system includes a first controller that is communicatively coupled to the first potentiostat and configured to control the first electrochemical measurement, and a second controller that is communicatively coupled to the second potentiostat and configured to control the second electrochemical measurement.

9. The analyte detection system according to claim 1, wherein the first electrochemical sensor is disposed on a first side of the probe, and the second electrochemical sensor is disposed on a second, opposite side of the probe.

10. The analyte detection system according to claim 1, wherein the first potentiostat is configured to perform a voltammetry measurement with the first electrochemical sensor, and the second potentiostat is configured to perform a chronoamperometry measurement with the second electrochemical sensor.

11. The analyte detection system according to claim 1, wherein the first analyte is skatole and the second analyte is androstenone.

12. The analyte detection system according to claim 1, wherein the second electrochemical sensor comprises NADH or NADPH and an enzyme that metabolises androstenone in the presence of NADH or NADPH.

* * * * *